(12) United States Patent
Kroon et al.

(10) Patent No.: US 11,483,546 B2
(45) Date of Patent: Oct. 25, 2022

(54) AUTO-STEREOSCOPIC DISPLAY DEVICE WITH A STRIPED BACKLIGHT AND TWO LENTICULAR LENS ARRAYS

(71) Applicant: KONINKLIJKE PHILIPS N.V., Eindhoven (NL)

(72) Inventors: Bart Kroon, Eindhoven (NL); Jan Van Der Horst, Eindhoven (NL); Eibert Gerjan Van Putten, s-Hertogenbosch (NL)

(73) Assignee: Koninklijke Philips N.V., Eindhoven (NL)

( * ) Notice: Subject to any disclaimer, the term of this patent is extended or adjusted under 35 U.S.C. 154(b) by 726 days.

(21) Appl. No.: 14/902,348

(22) PCT Filed: May 28, 2014

(86) PCT No.: PCT/EP2014/061164
§ 371 (c)(1),
(2) Date: Dec. 31, 2015

(87) PCT Pub. No.: WO2015/000645
PCT Pub. Date: Jan. 8, 2015

(65) Prior Publication Data
US 2016/0373733 A1    Dec. 22, 2016

(30) Foreign Application Priority Data

Jul. 2, 2013   (EP) ..................................... 13174715

(51) Int. Cl.
*H04N 13/398*    (2018.01)
*H04N 13/305*    (2018.01)
(Continued)

(52) U.S. Cl.
CPC .......... *H04N 13/398* (2018.05); *G02B 30/27* (2020.01); *H04N 13/305* (2018.05);
(Continued)

(58) Field of Classification Search
None
See application file for complete search history.

(56) References Cited

U.S. PATENT DOCUMENTS 5,465,175 A * 11/1995 Woodgate .......... G02B 27/2214
348/E13.029
5,808,792 A * 9/1998 Woodgate .......... G02B 27/0093
348/59
(Continued)

FOREIGN PATENT DOCUMENTS

| EP | 786912 A2 | 7/1997 |
| WO | 0215014 A1 | 1/2002 |
| WO | 2010150174 A1 | 12/2010 |

*Primary Examiner* — Mohammed Jebari

(57) ABSTRACT

Autostereoscopic display device comprising a backlight (66), a display panel (62) comprising rows and columns of pixels and a lenticular arrangement (60, 64), wherein the backlight (66) provides a striped output comprising stripes in the column direction or offset by an acute angle to the column direction the lenticular arrangement comprises a first lenticular lens array (60) on the side of the display panel (62) facing the display output for directing different display panel pixel outputs in different directions and a second lenticular lens array (64) on the opposite side of the display panel (62), facing the backlight (66), for providing collimation of the striped back-light output.

16 Claims, 13 Drawing Sheets

(51) Int. Cl.
  *H04N 13/317* (2018.01)
  *H04N 13/351* (2018.01)
  *G02B 30/27* (2020.01)
  *G02B 3/00* (2006.01)

(52) U.S. Cl.
  CPC ......... *H04N 13/317* (2018.05); *H04N 13/351* (2018.05); *G02B 3/0062* (2013.01)

(56) References Cited

U.S. PATENT DOCUMENTS

| | | | |
|---|---|---|---|
| 5,991,073 A * | 11/1999 | Woodgate | G02B 27/225 348/E13.004 |
| 6,064,424 A | 5/2000 | van Berkel et al. | |
| 6,369,949 B1 * | 4/2002 | Conley | G02B 3/0043 359/619 |
| 7,800,703 B2 | 9/2010 | Zuidema et al. | |
| 2004/0080938 A1 * | 4/2004 | Holman | F21S 8/08 362/231 |
| 2005/0111100 A1 * | 5/2005 | Mather | G02F 1/1323 359/464 |
| 2006/0038939 A1 * | 2/2006 | Okada | G02F 1/133555 349/110 |
| 2007/0018585 A1 * | 1/2007 | Ijzerman | G09F 19/14 315/15 |
| 2007/0040778 A1 * | 2/2007 | Karman | G02B 27/2214 345/87 |
| 2008/0204550 A1 * | 8/2008 | De Zwart | H04N 13/0404 348/51 |
| 2008/0316380 A1 * | 12/2008 | Ijzerman | G02B 27/2214 349/15 |
| 2011/0248994 A1 | 10/2011 | Van Der Horst | |
| 2011/0280018 A1 * | 11/2011 | Vissenberg | G02B 3/005 362/277 |
| 2012/0062991 A1 * | 3/2012 | Krijn | H04N 13/0404 359/463 |
| 2012/0092339 A1 | 4/2012 | Pijlman et al. | |
| 2013/0155503 A1 * | 6/2013 | Yen | H04N 13/0404 359/463 |
| 2014/0267639 A1 * | 9/2014 | Tatsuta | H04N 13/0404 348/59 |

* cited by examiner ic display device of the type that comprises a display panel having an array of display pixels for producing a display and an imaging arrangement for directing different views to different spatial positions.

AUTO-STEREOSCOPIC DISPLAY DEVICE WITH A STRIPED BACKLIGHT AND TWO LENTICULAR LENS ARRAYS

CROSS-REFERENCE TO PRIOR APPLICATIONS

This application is the U.S. National Phase application under 35 U.S.C. § 371 of International Application No. PCT/EP2014/061164, filed on May 28, 2014, which claims the benefit of European Patent Application No. 13174715.6, filed on Jul. 2, 2013. These applications are hereby incorporated by reference herein.

FIELD OF THE INVENTION

This invention relates to an autostereoscopic display device of the type that comprises a display panel having an array of display pixels for producing a display and an imaging arrangement for directing different views to different spatial positions.

BACKGROUND OF THE INVENTION

A first example of an imaging arrangement for use in this type of display is a barrier, for example with slits that are sized and positioned in relation to the underlying pixels of the display. In a two-view design, the viewer is able to perceive a 3D image if his/her head is at a fixed position. The barrier is positioned in front of the display panel and is designed so that light from the odd and even sub-pixel columns is directed towards the left and right eye of the viewer, respectively.

A drawback of this type of two-view display design is that the viewer has to be at a fixed position, and can only move approximately 3 cm to the left or right. In a more preferred embodiment there are not two sub-pixel columns beneath each slit, but several. In this way, the viewer is allowed to move to the left and right and perceives a stereo image in his/her eyes all the time.

The barrier arrangement is simple to produce but is not light efficient. A preferred alternative is therefore to use a lens arrangement as the imaging arrangement. For example, an array of elongate lenticular elements can be provided extending parallel to one another and overlying the display pixel array, and the display pixels are observed through these lenticular elements.

The lenticular elements are provided as a sheet of elements, each of which comprises an elongate semi-cylindrical lens element. The lenticular elements extend in the column direction of the display panel, with each lenticular element overlying a respective group of two or more adjacent columns of display sub-pixels.

If each lenticule is associated with two columns of display sub-pixels, the display sub-pixels in each column provide a vertical slice of a respective two dimensional sub-image. The lenticular sheet directs these two slices and corresponding slices from the display sub-pixel columns associated with the other lenticules, to the left and right eyes of a user positioned in front of the sheet, so that the user observes a single stereoscopic image. The sheet of lenticular elements thus provides a light output directing function.

In other arrangements, each lenticule is associated with a group of four or more adjacent display sub-pixels in the row direction. Corresponding columns of display sub-pixels in each group are arranged appropriately to provide a vertical slice from a respective two dimensional sub-image. As a user's head is moved from left to right, a series of successive, different, stereoscopic views are perceived creating, for example, a look-around impression.

The above described device provides an effective three dimensional display. However, it will be appreciated that, in order to provide stereoscopic views, there is a necessary sacrifice in the horizontal resolution of the device. This sacrifice in resolution increases with the number of views generated. Thus, a major drawback of using a high number of views is that the image resolution per view is reduced. The total number of available sub-pixels has to be distributed among the views. In the case of an n-view 3D display with vertical lenticular lenses, the perceived resolution of each view along the horizontal direction will be reduced by a factor of n relative to the 2D case. In the vertical direction the resolution will remain the same. The use of a barrier or lenticular that is slanted can reduce this disparity between resolution in the horizontal and vertical direction. In that case, the resolution loss can be distributed evenly between the horizontal and vertical directions.

Increasing the number of views thus improves the 3D impression but reduces the image resolution as perceived by the viewer. The individual views are each in so-called viewing cones, and these viewing cones repeat across the field of view.

The viewing experience is hampered by the fact that the viewers are not entirely free in choosing their location from which to view a 3D monitor or television: at the boundaries between viewing cones the 3D effect is absent and annoying ghost images appear. There is therefore a desire to have the viewing cones as wide as possible, for example so that a viewer can remain within a single central viewing cone and still be able to move position. However, designing the optical system to provide a wide viewing cone comes at the expense of either increased cross talk between the images of different views or a substantial loss of spatial resolution due to the generation of additional views. Furthermore, such an optical system can require a thick optical stack.

EP0 786 912 discloses an autostereoscopic display in which laterally overlapping viewing windows are provided to enable observer tracking.

SUMMARY OF THE INVENTION

The invention is defined by the claims.

According to one aspect, there is provided an autostereoscopic display device comprising: a backlight; a display panel comprising rows and columns of pixels; and a lenticular arrangement, wherein the backlight provides a striped output comprising stripes in the column direction or offset by an acute angle to the column direction, wherein the lenticular arrangement comprises a first lenticular lens array on the side of the display panel facing the display output for directing different display panel pixel outputs in different directions and a second lenticular lens array on the opposite side of the display panel, facing the backlight, for providing collimation of the striped backlight output.

This arrangement makes use of a striped backlight to enable a better compromise between crosstalk and the optical stack thickness to be achieved.

Note that the term "pixel" in this definition is used to denote the smallest addressable image element. For a colour display, this will be a sub-pixel. Unless specifically discussing a pixel as a group of sub-pixels, the term "pixel" should be understood accordingly as the smallest display element.

The first lenticular arrangement is preferably negative and provides the view spreading function of directing different views to different angular positions. The second lenticular arrangement, which is preferably positive, provides the function of collimating the backlight stripe output.

As the light from a stripe does not only interact with the nearest lens, but also with other lenses in the lenticular lens array, each stripe forms multiple beams of light. The viewing cone is the angle between two consecutive such beams.

The viewing cone of the second (collimating) lenticular lens array (expressed as an angle tangent) is preferably an integer multiple N of the view spreading of the first lenticular lens array (again expressed as an angle tangent).

This means the two lenticular lens arrays can be designed to satisfy:

$$\tan \alpha_1 = \frac{\tan \alpha_2}{N},$$

where α1 is the angular spread of light from the lenses of the first lenticular array, and α2 is the viewing cone of light to the lenses of the second lenticular array to give a collimated output.

When N=1, there is one backlight stripe to each collimating lenticular lens. The effect of the backlight stripe arrangement is to provide a collimated light output. The viewing cone of the second (collimating) lenticular lens array then corresponds to the view spreading of the primary (view spreading) lenticular array.

When N>1, there are N backlight stripes to each lenticular lens. The different backlight stripes can be operated time-sequentially to build up a large viewing cone over time. With N=2, there can be two subframes each providing half of a viewing cone. The view spreading of the primary (view spreading) lenticular lens should then be half of the viewing cone of the secondary lens, to meet the relationship above.

The device thus preferably further comprises a controller, which is adapted to:

drive the display panel in a sequence of N subframes, each subframe being synchronised with illumination with a respective set of backlight stripes.

The device can be designed with:

$$C\frac{w_1}{p_1} = N\frac{w_2}{p_2}.$$

wherein $w_1$ is the width of a sub-pixel of the display panel, $p_1$ is the lenticular pitch (in the width direction) of the first (view spreading) lenticular lens array, $w_2$ is the width of a backlight stripe and $p_2$ is the lenticular pitch of the second (collimating) lenticular lens array, and wherein C is preferably below 1.0, for example in the range 0.5 to 1.0.

This range of values of C provides a compromise between the light output (since the smaller $w_2/p_2$ becomes, the smaller the area generating backlight output) and crosstalk.

The backlight stripes are preferably slanted to the display column direction. Preferably the optical axes of both lenticular lenses and the backlight stripes run in parallel.

BRIEF DESCRIPTION OF THE DRAWINGS

An embodiment of the invention will now be described, purely by way of example, with reference to the accompanying drawings, in which.

DETAILED DESCRIPTION

The invention provides an autostereoscopic display device in which a striped backlight is used in combination with a two-layer lenticular arrangement. This arrangement provides collimation of the backlight output as well as providing a view forming function.

The problems addressed by the invention will first be described in more detail before an explanation of the invention is provided.

Figure 1:
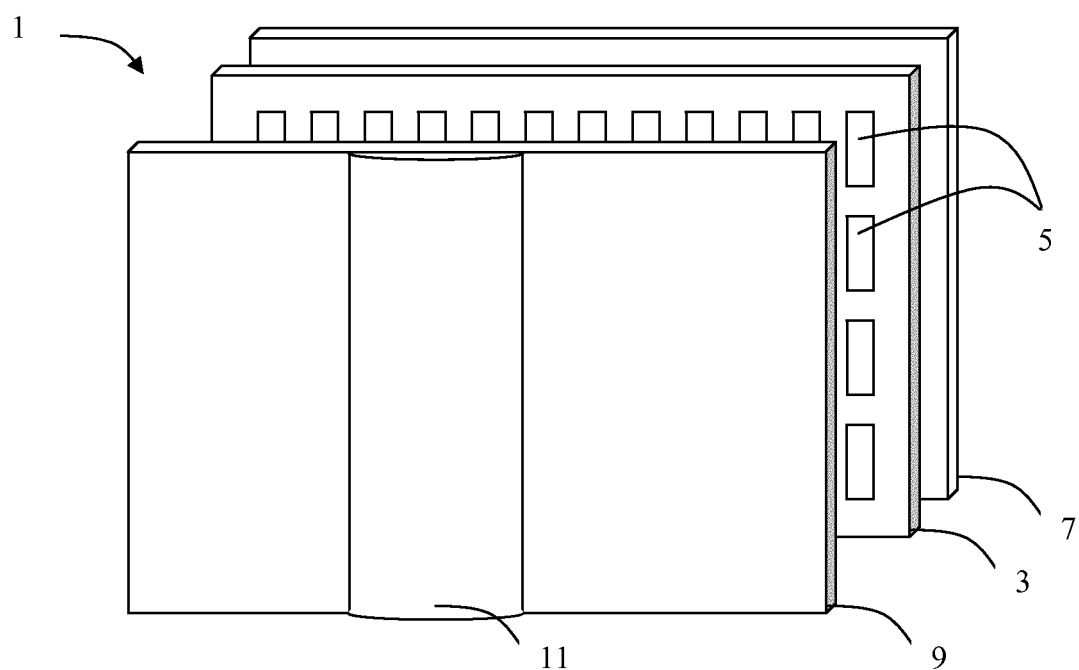
FIG. 1 is a schematic perspective view of a known autostereoscopic display device.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of display pixels 5 (or more accurately sub-pixels for a colour display) arranged in rows and columns. For the sake of clarity, only a small number of display pixels 5 are shown in the Figure. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarising layers are also provided on the outer surfaces of the substrates.

Each display pixel 5 comprises opposing electrodes on the substrates, with the intervening liquid crystal material therebetween. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticular elements 11 extending parallel to one another, of which only one is shown with exaggerated dimensions for the sake of clarity.

The lenticular elements 11 are in the form of convex cylindrical lenses, and they act as a light output directing means to provide different images, or views, from the display panel 3 to the eyes of a user positioned in front of the display device 1.

The autostereoscopic display device 1 shown in FIG. 1 is capable of providing several different perspective views in different directions. In particular, each lenticular element 11 overlies a small group of display pixels 5 in each row. The lenticular element 11 projects each display pixel 5 of a group in a different direction, so as to form the several different views. As the user's head moves from left to right, his/her eyes will receive different ones of the several views, in turn.

The skilled person will appreciate that a light polarising means must be used in conjunction with the above described array, since the liquid crystal material is birefringent, with the refractive index switching only applying to light of a particular polarisation. The light polarising means may be provided as part of the display panel or the imaging arrangement of the device.

Figure 2:
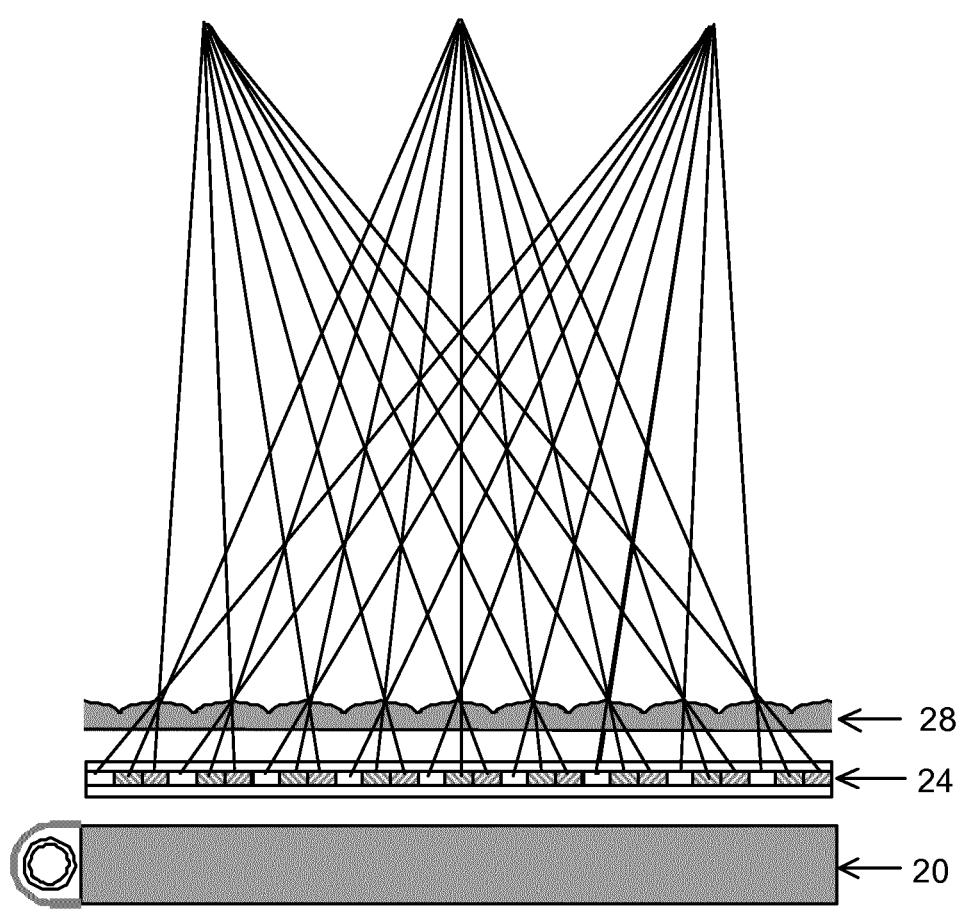
FIG. 2 shows how a lenticular array provides different views to different spatial locations.

FIG. 2 shows the principle of operation of a lenticular type imaging arrangement as described above and shows the backlight 20, display device 24 such as an LCD and the lenticular array 28. FIG. 2 shows how the lenticular arrangement 28 directs different pixel outputs to three different spatial locations.

Figure 3:
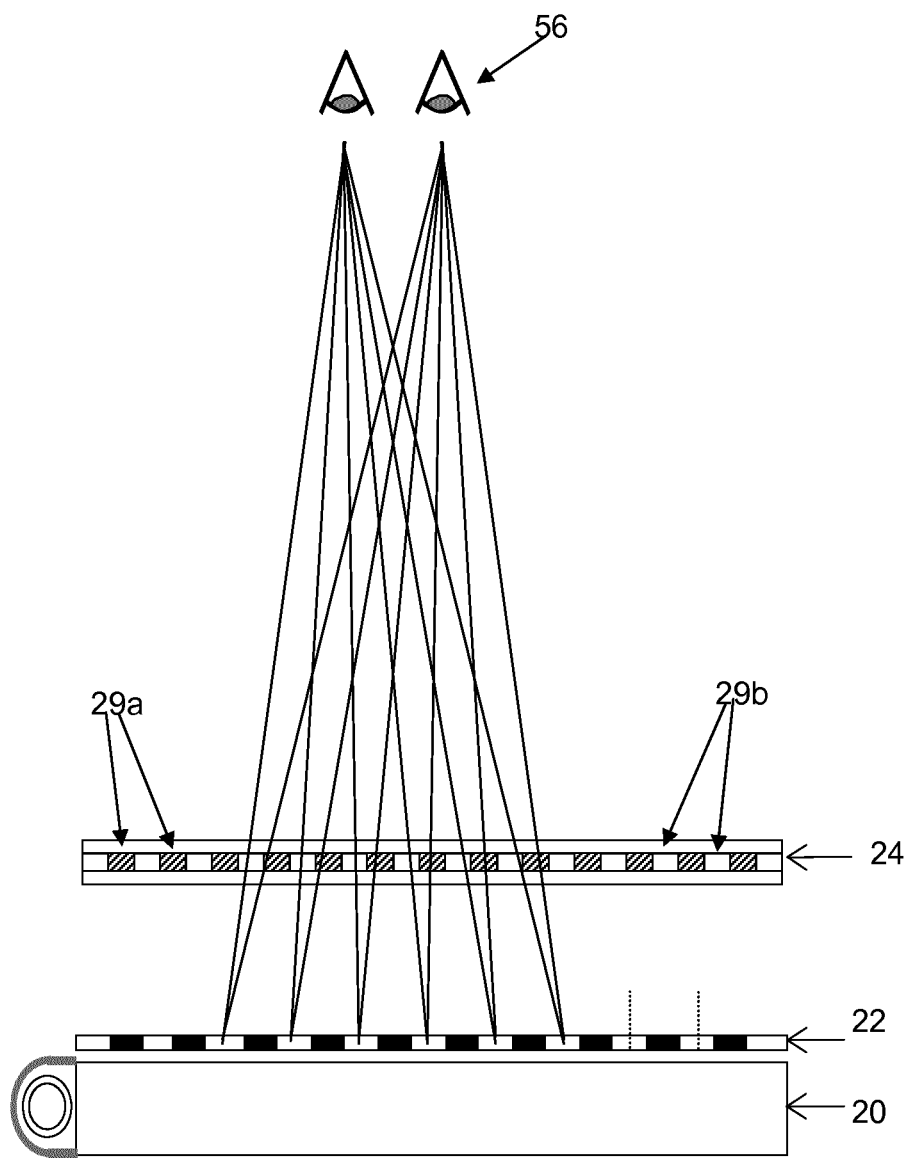
FIG. 3 shows how a barrier arrangement provides different views to different spatial locations.

FIG. 3 shows the principle of operation of a barrier type imaging arrangement showing the backlight 20, barrier device 22 and display device 24 such as an LCD. FIG. 3 shows how the barrier device 22 provides a patterned light output. This means that different pixels are illuminated by discontinuous light source regions, with the effect that a light directing function is implemented. As shown, pixels 29a for one view are illuminated from one direction and pixels 29b for another view are illuminated from another direction. The two eyes of the viewer receive light modulated by different pixels of the display.

Figure 4:
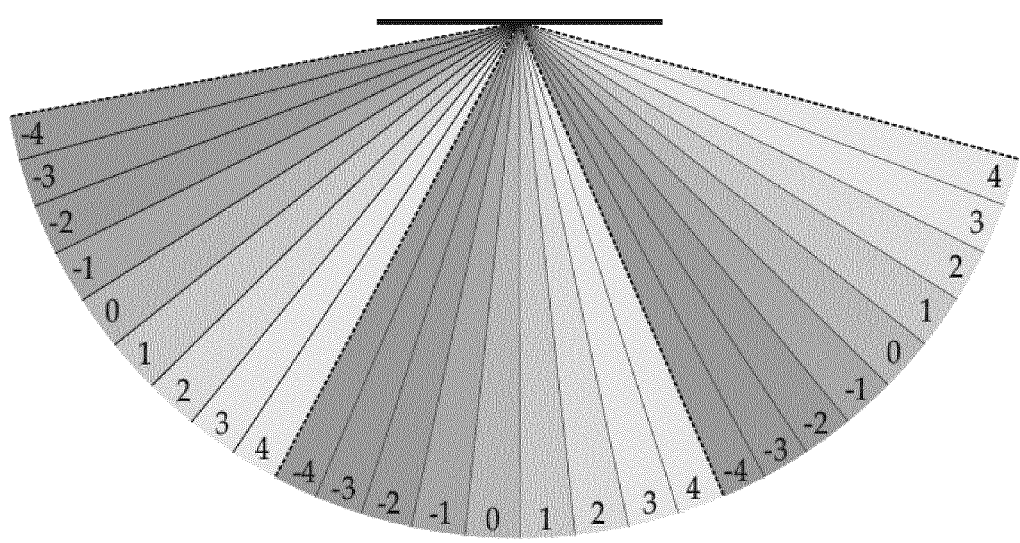
FIG. 4 shows how the multiple views are provided in viewing cones.

In these systems, each view is projected to a certain spatial location. FIG. 4 shows how a 9 view system generates a repeating pattern of nine views (numbered −4 to +4 in FIG. 4), each within a respective viewing cone. The pattern that is created by the light that passes from each of the pixels through the lenticules directly in front is called the primary viewing cone. As the light emanating from a pixel also passes through other lenticules, the pattern repeats to provide the so-called cone repetition seen in FIG. 4. The effect is crucial as it enlarges the viewing angle of the display to be close to the full 180 degrees. The full angle of the primary viewing cone ($\alpha$) approximately relates to the lenticular pitch (p) and lens focal length (F) as:

$$\alpha = 2 \tan^{-1} \frac{p}{2F} \approx \frac{p}{F}$$

Each lateral position under a lenticular lens will be directed to a different lateral viewing position. If there is an integer number of sub-pixels under each lens (in the width direction), then the number of views corresponds to this integer number. In the case of fractional view displays, where there is not an integer number of sub-pixels (in the width direction) under each lens width, the number of discrete view positions can be large.

The number of views that can be created with no crosstalk is equal to the ratio of the lens pitch and the sub-pixel pitch (this ratio may be non-integer). By slanting the lens, the views of every other row have an angular offset. For a slant of ⅙, this offset is equal to half the angular width of a single view.

For example, if the first row creates 4.5 views, the views are for example projected under angles 0 to 1, 1 to 2, 2 to 3, and 3 to 4 degrees. The second row then creates the views under angles 0.5 to 1.5, 1.5 to 2.5, 2.5 to 3.5, and 3.5 to 4.5 degrees.

The display thus projects light into 9 different angles between 0 and 4.5 degrees. However, the width of each view is in this example equal to 1 degree so these 9 'fractional' views have considerable crosstalk. Effectively there are only 4.5 "separable" views i.e., without crosstalk.

In general, the number of separable views is approximately equal to the ratio between the lens and pixel component pitch. A suitable choice of the slant and the lens pitch could lead to the generation of more views at the cost of increased crosstalk.

For example, the 9-view Philips WOWvx 42" (107 cm) display has a pitch of 4.5 and a slant of ⅙ (i.e. the example given above). View numbers 3 and 5 have only a little crosstalk between them, but the projection of views 3 and 4 overlap significantly.

The optical stack (the lenticular structure 9 in FIG. 1) consists of a spacer and the lenticular lenses that are possibly integrated into a single unit. Assuming that the lenticular pitch (p) and the viewing cone angle ($\alpha$) are chosen, then the thickness of the optical stack (e), is approximately equal to e=np/$\alpha$ with n the index of refraction (IOR) of the spacer. This approximation is valid for static and switchable lens stacks.

For a practical example consider:

42" (107 cm) Full High Definition display; that is 480 μm for an RGB unit cell and 160 μm for a pixel.

A lens pitch of 4.5 pixels=720 μm.

A cone angle of 10° (0.17 rad).

A small slant angle.

The thickness of the lenticular stack is approximately equal to e=np/$\alpha$=1.5×720 μm/0.17=6.4 mm.

A lenticular display with slanted lenses has crosstalk, even under the assumption of perfect lens focus. This crosstalk is caused by the angular intensity profile of each pixel.

To address the issue of crosstalk in a system, a measure is needed of crosstalk that is independent of the actual shape of the crosstalk profile.

The full-width half modulation (FWHM) of the power spectrum of a pulse is a well-known metric to determine the bandwidth of a low-pass filter. It is the full width of the peak of the power spectrum at half of the maximum. It indicates how much of the original signal passes through the filter (higher bandwidth and therefore FWHM implies more signal detail).

For an analysis of crosstalk, the angular intensity profile is considered.

As outlined above, the invention provides a striped backlight combined with a two-layer lenticular. There are thus stripes of emitted or transmitted light, magnified by a lenticular lens arrangement. This subsystem of backlight and collimating lenticular can be approximated by a rectangular function.

Figure 5:
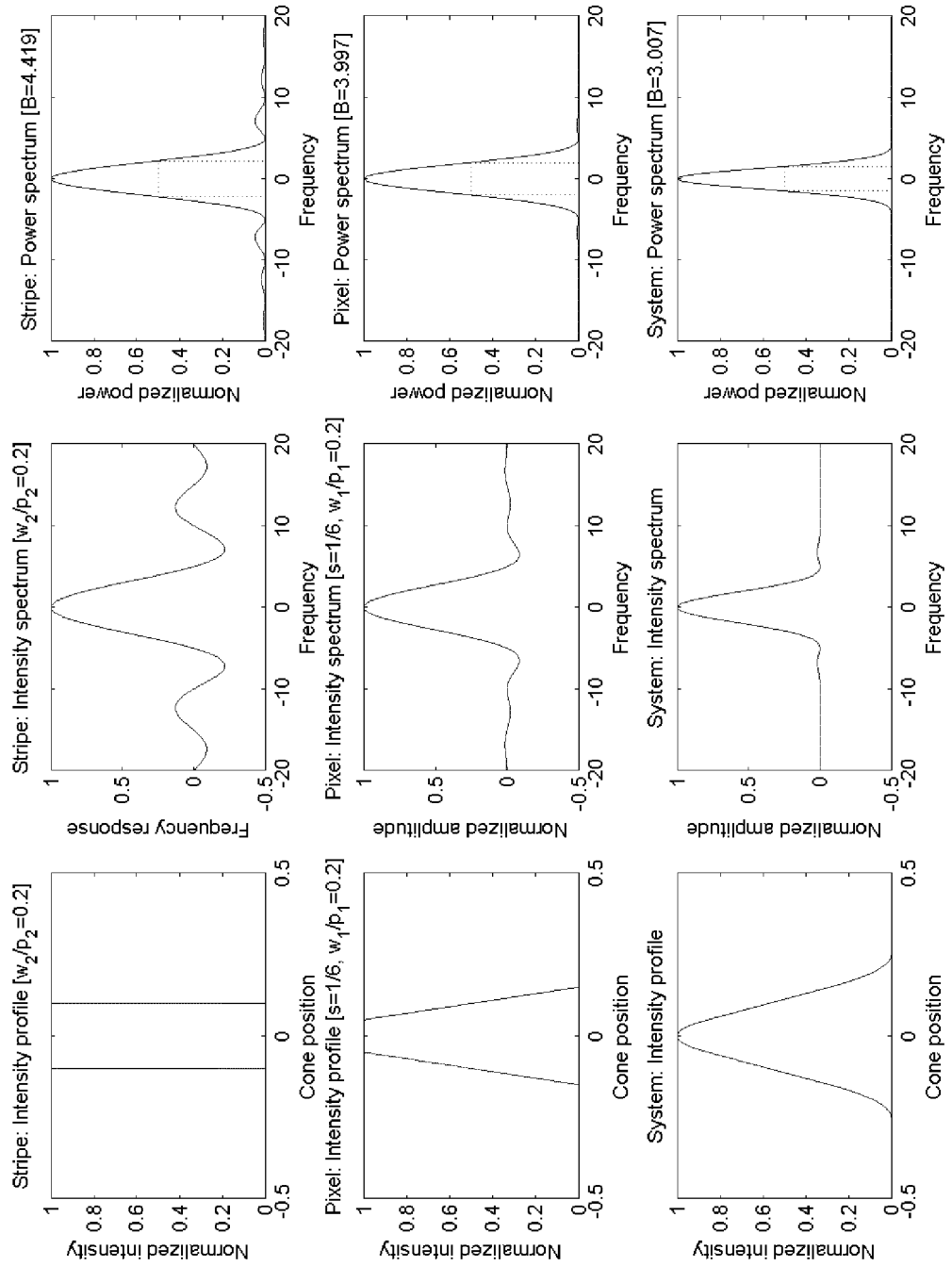
FIG. 5 shows an analysis of the optical response of the backlight stripe, pixel and overall system.

The top row of FIG. 5 provides a modelling of the intensity profile, spectrum and power spectrum respectively for the rectangular function which represents the striped backlight output.

Furthermore, there are sub-pixels with another lenticular lens that is slanted with respect to the sub-pixels. Depending on the slant angle, this subsystem can be approximated by a rectangular, triangular or hybrid function. The middle row of FIG. 5 provides a modelling of the intensity profile, spectrum and power spectrum respectively where the slant is half the sub-pixel aspect ratio (e.g. slant ⅙ for RGB stripes).

The crosstalk of the display system for shallow angles is the circular convolution of the two crosstalk profiles, as shown by the bottom row.

If there are only two full views, then a sensible definition of crosstalk is the intensity ratio between light from the other view over the total intensity. With more than two but still a small number of views (e.g. 9), the above definition of crosstalk can be extended as the contribution of neighbouring views to the total intensity of a view, also as an intensity ratio. This simplifies to the same definition when there are two views.

With many fractional views, there is no clear definition of neighbouring views. Instead, the view space can be considered to be continuous by approximation. Consequently, crosstalk is defined more abstractly as the shape of the angular intensity profile: the wider this profile, the narrower the frequency response, and the more the crosstalk.

The system spectrum is the product of the two spectra. The bottom row of FIG. 5 shows the system angular response, system spectrum and system power spectrum.

The x-axis for the first column of plots indicates the position in the viewing cone, where the x-axis is normalized, i.e. the viewing cone width is 1 and the centre of the viewing cone is defined at position 0. Thus, the range [−0.5, 0.5] corresponds to the primary viewing cone. This makes the x-axis a dimensionless quantity.

The spectrum plots have normalised frequency as the x-axis. For example, a pattern with the left half of the viewing cone white and the right half black repeats once per viewing cone. This corresponds to a frequency of 1. To make 10 such patterns (left-right- . . . left-right with 10 left and 10 right) in a single viewing cone, the pattern of light repeats 10 times per viewing cone. This corresponds to a frequency of 10. Thus, the x-axis can be considered to represent a frequency analysis applied on cone positions. Due to crosstalk, not all patterns are equally visible, and especially higher frequencies are reduced. The power spectrum plot shows how much of which frequencies are preserved.

From the example in FIG. 5, it is clear that the system crosstalk (FWHM metric) exceeds that of the constituent components. The width at half power for the system power spectrum (the right column) has decreased from the middle row to the bottom row, as indicated by the dotted lines. The dotted lines correspond to the definition of FWHM.

If the stripe and sub-pixel widths are varied, effectively changing the crosstalk of the components, the component with most of the crosstalk has the biggest influence on the overall crosstalk.

Figure 6:
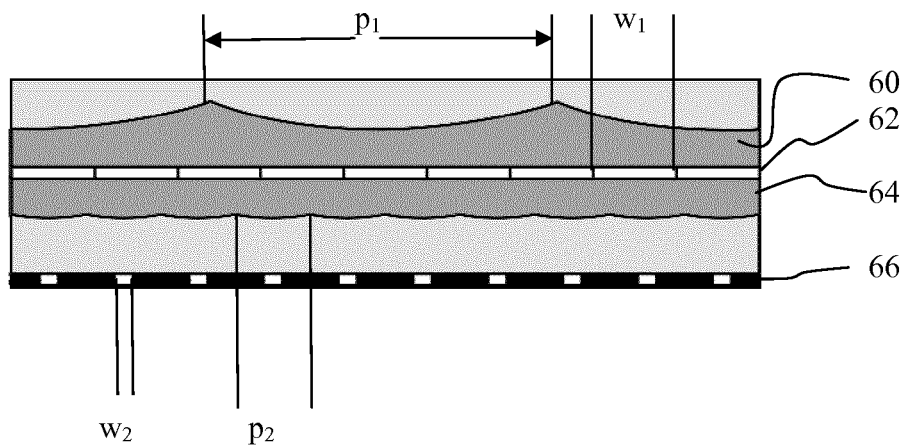
FIG. 6 shows a first example of display device of the invention.
Figure 6:
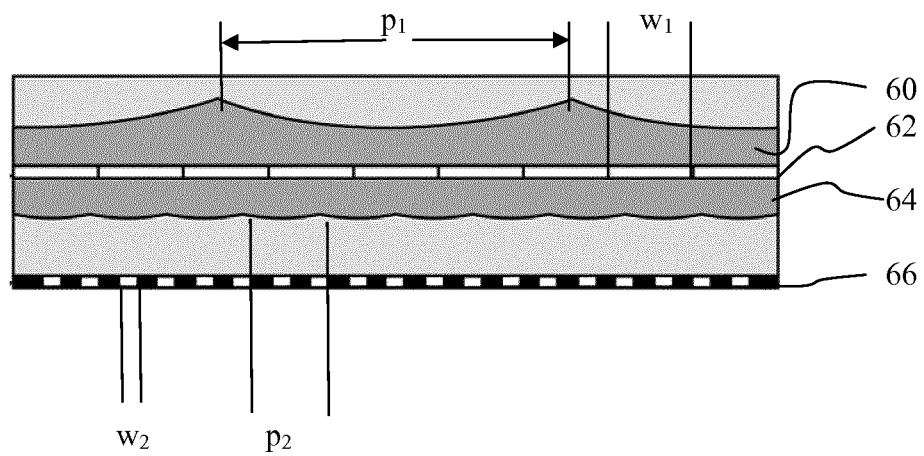

FIG. 6 shows two first examples of display device of the invention. These examples comprise a stack of layers comprising a first (primary) negative lenticular lens (lens 60), a transmissive display panel 62, a second (secondary) positive lenticular lens (lens 64) with appropriate spacing and a striped backlight 66 with limited aperture. Each lenticular lens comprises an array of parallel lenticules. Each lenticule is an elongate semi-cylindrical lenslet.

The light from the backlight stripes is collimated by the secondary lens 64 and fanned out by the primary lens 60. The primary lens 60 thus provides the view forming function and the secondary lens 64 provides collimation. For backlight stripes that are thin enough and with appropriately chosen lens parameters, this creates a projection of views similar to a regular 3D lenticular display.

The two lenticular lenses 60, 64 are allowed to be of different materials, shape and pitch. However they should preferably have the same slant direction and the viewing cones ($\alpha_1$ and $\alpha_2$) should be related. In particular, when N is the number of independently controllable backlight stripes per secondary lenticule (of the collimating lens 64), then the following relation should hold:

$$\tan \alpha_1 = \frac{\tan \alpha_2}{N},$$

The secondary lenticular array 64 provides collimation for light received from the backlight stripe over an angle $\alpha_2$, and the primary lenticular array provides a viewing cone of width $\alpha_1$.

Figure 18:
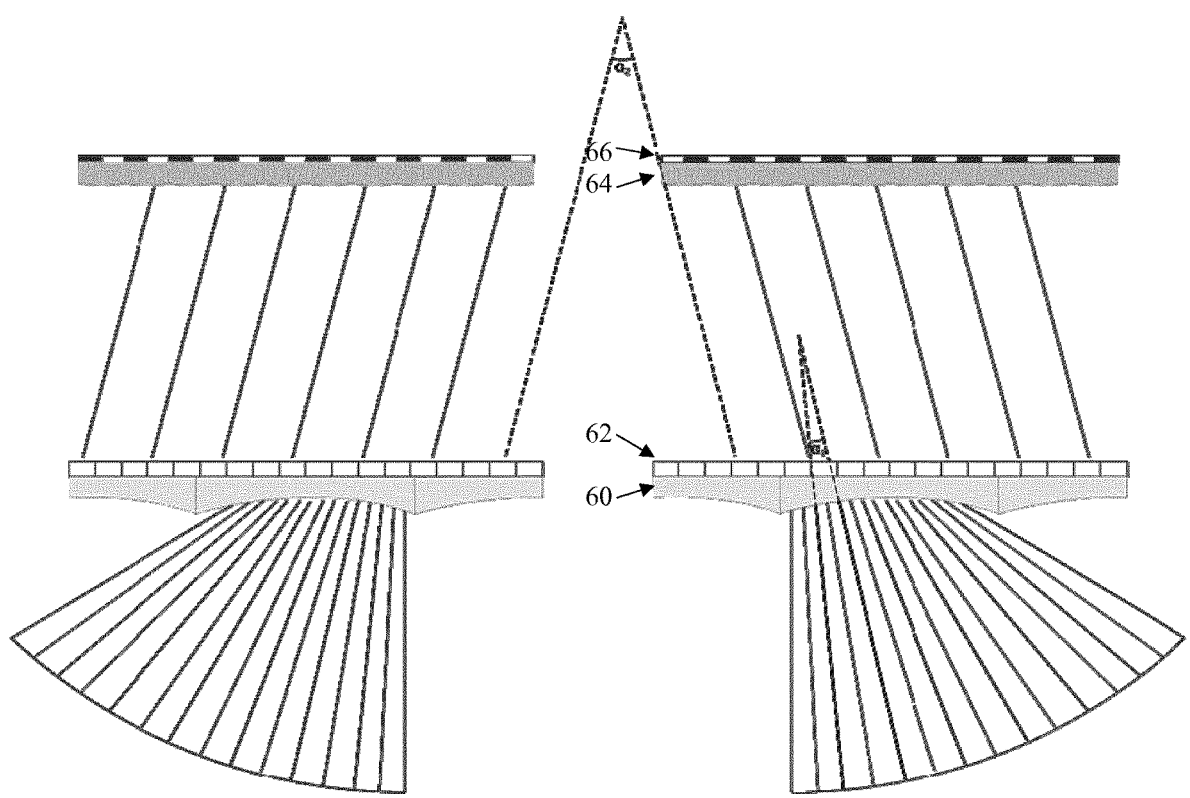
FIG. 18 is used to show graphically the meaning of angles α1 and α2.

These parameters $\alpha_1$ and $\alpha_2$ are shown in FIG. 18 for clarity. Angle $\alpha_1$ is the viewing cone angle determined by the lenticular array 60. Angle $\alpha_2$ is angle between the two different collimation directions generated by the combination of the backlight and the secondary lenticular array 64.

The parameters which influence the design are:

N is the number of independently controllable backlight stripes per secondary lenticule. FIG. 6(a) shows the design with N=1, and FIG. 6(b) shows the design with N=2;

$p_1$ is the lenticular pitch of the primary (view spreading) lenticular lens array 60;

$w_1$ is the pixel (or sub-pixel) width;

$p_2$ is the pitch of the secondary (collimating) lenticular array 64;

$w_2$ is the width of the backlight stripes.

These are shown in FIG. 6.

Figure 7:
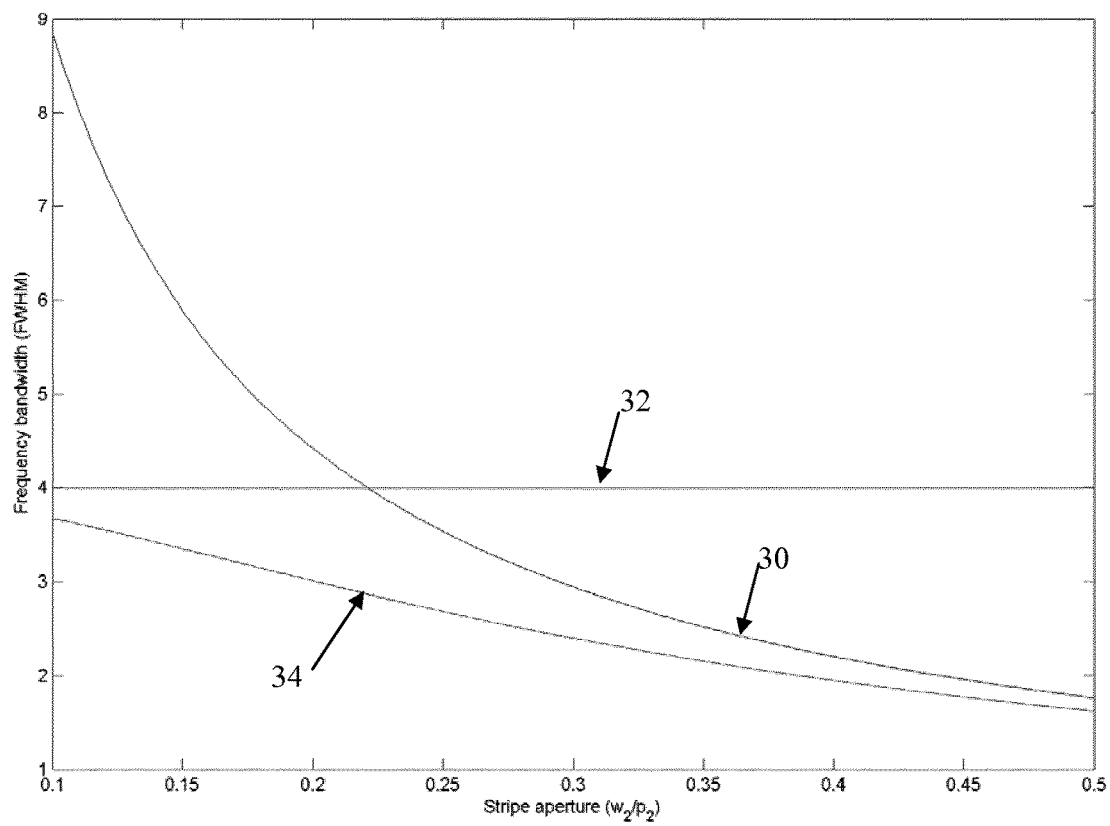
FIG. 7 shows how the system bandwidth varies in response to a change in the backlight stripe width.
Figure 8:
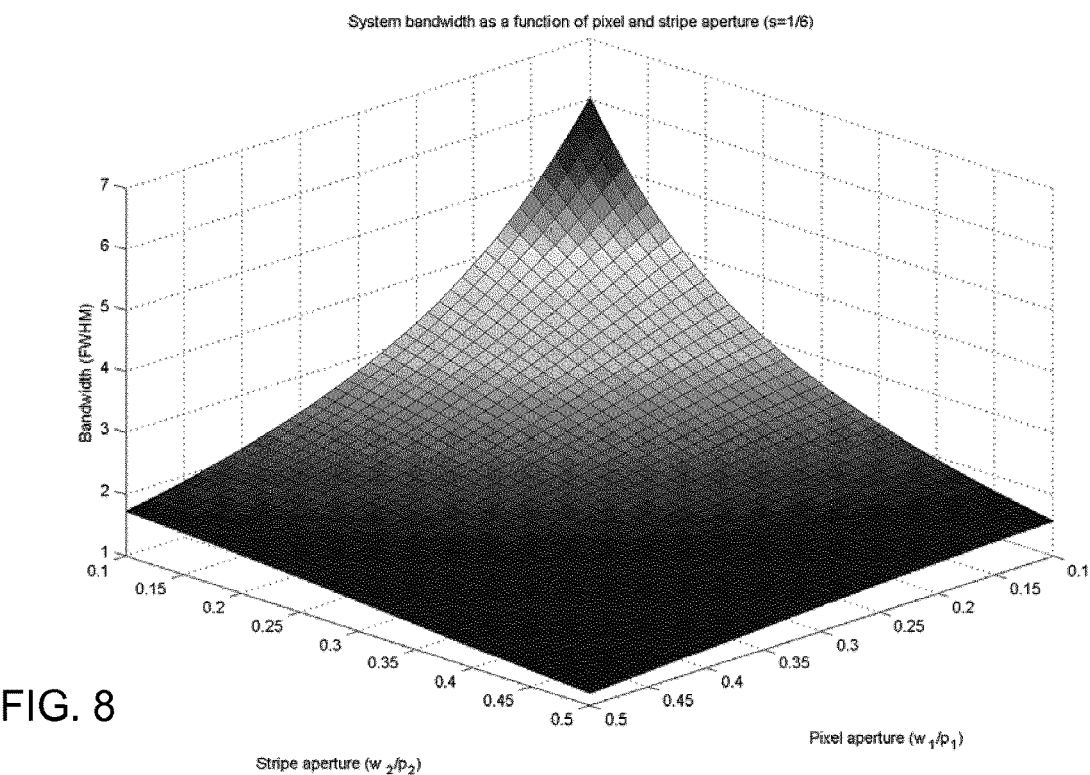
FIG. 8 shows how the system bandwidth varies in response to a change in the backlight stripe width and the pixel aperture.

FIG. 7 shows how the bandwidth is affected as the aperture ($\alpha_2 = w_2/p_2$) of the stripe is varied all else equal, and FIG. 8 shows how the bandwidth is affected when also the aperture ($\alpha_1 = w_1/(Np_1)$) of the sub-pixel is varied, for instance by changing the lenticular pitch ($p_1$).

FIGS. 7 and 8 plot (as y-axis) the system FWHM bandwidth B.

This parameter is dimensionless. In the left column of FIG. 5, the x-axis is the position relative to the lens so [−0.5, 0.5] corresponds to the primary cone. In the centre and right column of FIG. 5, the x-axis corresponds to frequencies in the same space, which is thus also dimensionless.

The values of B can be intuitively considered to approximate to the number of times that the intensity profile "fits" in a single cone. For the rectangle pulse with aperture 20%, the bandwidth is 4.4. For an aperture 40%, the bandwidth is 2.2.

In FIG. 7, plot 30 is the response for the backlight stripe, plot 32 is for the lenticular and plot 34 is for the overall system.

The parameters shown in FIG. 6 can be related by the formula:

$$C\frac{w_1}{p_1} = N\frac{w_2}{p_2}.$$

To keep the crosstalk low, both apertures have to be small. If one is much bigger than the other, than the bigger one is causing the crosstalk. The value C in the formula above represents this trade off. For C approximating to 0, the backlight system (stripes) virtually adds no crosstalk to the system (for small angles). For C=1, both stripes and pixels contribute similarly to the system crosstalk. In practice the width of the stripes is a trade-off between light output and crosstalk.

At C>1 the pitch of the front lenticular should be reduced (lowering C) as this provides more spatial resolution in 3D mode without sacrificing too much view resolution. With insufficient light output and small C, stripes could be broadened, again without sacrificing too much view resolution. It is preferred to set C<=1. It may be in the range 0.5 to 1.0.

In FIG. 5, moving in the x-direction corresponds to changing the value of C.

Figure 9:
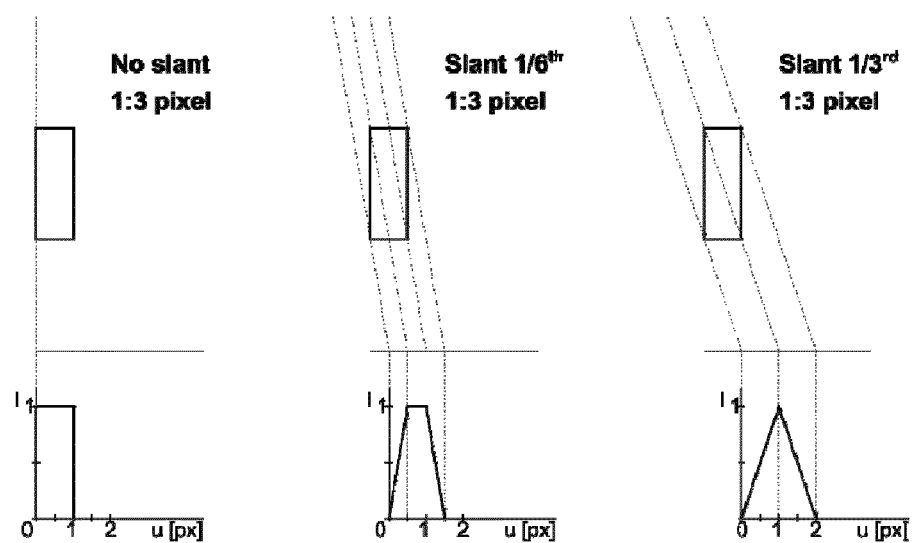
FIG. 9 is used to show the cross talk effect for pixels with different slant.

FIG. 9 is used to show the cross talk effect, and shows a sub-pixel with no slant, a sub-pixel with slant ⅙ and a sub-pixel with slant ⅓. The slant is defined as the tangent of the angle made with the vertical. The intensity plots show the intensity across the lens width direction, and it can be seen that the width of the intensity profile is greater than the sub-pixel width as a result of the tilting of the sub-pixel shape with respect to the lens axis.

To have an indication of crosstalk, the number of separable views can be considered. The number of separable views is given by the ratio of the lenticular pitch to the width of the intensity profile. For a dual-view design (lens pitch of two sub-pixels and no slant), the intensity profile has a width of 1 so that gives a 2:1 ratio, corresponding to two separable views. For a typical multi-view design (pitch 4.5, slant ⅙ as in the example above), the intensity profile has a full width half modulation (FWHM) of 1 so that gives a 9:2 ratio.

The number of fractional views a display can generate is determined by both the slant and the lens pitch. The number of separable views is instead equal to the lens pitch (expressed in units of the (sub) pixel width).

The display is driven with the number of fractional views and the crosstalk is then proportional to the ratio of the number of fractional views to the number of separable views.

While creating more fractional views has certain advantages (e.g. smoother angular transitions and reduction of banding), the number of separable views is more important for the depth perception of a display.

It will be clear from the above discussion that there are various trade-offs that can be made.

A smaller cone angle implies that the projected views are both smaller and closer together. Assuming that the rendering of 3D content is appropriately adjusted, then the difference of consecutive views is smaller and thus visibility of crosstalk is reduced. As a consequence the perception of depth increases. Also, when a user moves within the smaller viewing cone, motion parallax is smoother. The disadvantages of a smaller cone are that they generally require a thicker lens and that the user has less freedom of movement without crossing the viewing cone boundaries.

Another way to project views closer together is by having more separable views while keeping the total viewing cone the same. This requires an increase in lens pitch compared to the display sub-pixel pitch. The disadvantage is that the spatial resolution of the views is inversely dependent on the pitch. A costly method to improve the quality of 3D lenticular displays is to use higher resolution display panels. While common FHD display panels have 2 million RGB pixels, panels with 8 million RGB (QFHD) or even more are for sale.

There is thus a trade-off between depth perception, freedom of movement, spatial resolution, display thickness and panel cost.

As LCD panels are becoming faster, they allow for stereoscopic 3D viewing by producing two views in time sequential mariner. It is tempting to use such a panel to create an autostereoscopic display where views are created by spatial and temporal multiplexing. One such approach is disclosed in WO 2010/150174 and is based on birefringent lenses.

The invention aims to provide a design that in comparison to a regular 3D lenticular display and for reasonable parameters has a thinner optical stack and, in some embodiments, allows for time sequential operation to create a more suitable trade-off between spatial resolution and 3D effect.

As outlined above, the full viewing cone of the secondary lenticular array 64 is equal to $\alpha_2$. If only a small area is illuminated under the lenticular lens (by the stripe) the light is collimated over a smaller angle than $\alpha_2$.

The angle of collimation α_stripe is approximately $$\alpha\_stripe=\alpha_2(w_2/p_2)$$

where $w_2$ is the width of a stripe and $p_2$ the lens-pitch of the secondary lenticular array 64.

The pitches of the first and the second lenses are independent. The secondary lens acts as a collimator of the light from the backlight-stripes. Hence, the secondary lens with could have very small pitch and consequently very thin. This would require very thin stripes in the backlight.

For N=1, the display is only spatially multiplexed, but because the stripe width of the backlight can be made smaller than the sub-pixel pitch of the display panel, it is possible to create a thinner display and thereby reduce weight. There is no direct relation between the two lens pitches. There is instead a relation between the view spreading (α1) and the viewing cone (α2). Reducing the pitch, keeping the viewing cone equal, makes the backlight thinner The thickness L2 of the secondary lens is given by (in one particular design):

$$L2=n_2/(n_2-n_1)R2$$

where R2 is the radius of the lenses and $n_1$ and $n_2$ the refractive indices of the two lens layers.

The radius R is determined by the viewing cone, $\alpha_2$, that is to be created. For $p_2/R2 \ll 1$, R is approximately equal to:

$$R2=p_2(n_2-n_1)/\alpha_2,$$

with $p_2$ being the lenticular pitch of the secondary lens array.

Finally the pitch $p_2$ depends on the total amount of views to generate N_total=N_front*N and the width of the backlight stripes, $w_2$.

For higher N, the display is spatially and temporally multiplexed as both the display panel and the backlight generate views.

Figure 10:
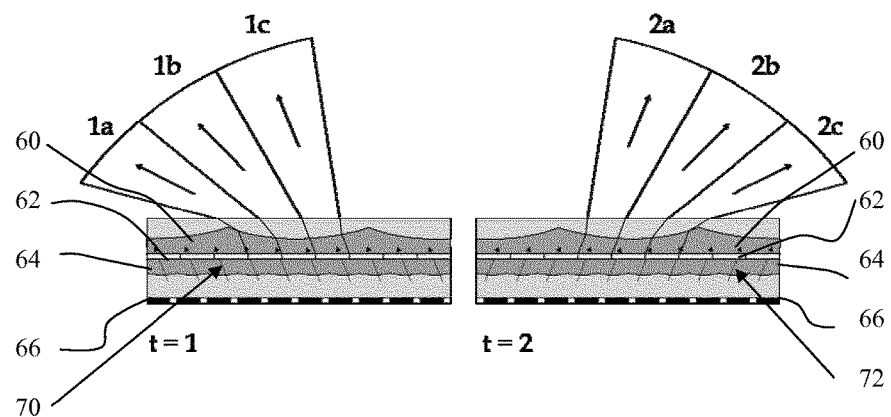
FIG. 10 shows a second example of display device of the invention and shows how time sequential operation can function.

The effect of values N>1 is represented in FIG. 10.

FIG. 10 shows the view directions for a dual phase time-sequential display. The collimating lens is at the surface of the backlight, with two backlight stripes per second lens (N=2). By dividing the backlight into multiple stripes beneath each lens of the second lenticular array 64, time sequential operation is possible. For N=2, there are two sub-frames. The left image shows the odd subframes and the right image shows the even subframes.

During the odd subframes, the striped backlight in combination with the secondary lens 64 causes the light reaching the lens arrangement to be collimated in one direction represented by arrows 70. The primary lens 60 then creates a set of views 1a to 1c.

During the even subframes, the striped backlight in combination with the secondary lens 64 causes the light reaching the lens arrangement to be collimated in a different direction represented by arrows 72. The primary lens 60 then creates a set of views 2a to 2c.

Each set of views can be considered to be half of a viewing cone, so that the viewing cone is built up time sequentially.

The primary lenticular lens 60 is preferably negative (i.e. it spreads a parallel beam) while the secondary lenticular lens 64 is positive (i.e. it focuses a parallel beam). In case the primary lenticular lens 60 is positive the focus point should be in front of the viewer (i.e. the focus point is in between the display and the viewer) so that eventually the beam is also spread in a similar way as with a negative lens. Best optical performance is obtained when the lenticular lenses have a replica so that the refractive index difference at the lens boundaries can be controlled to be smaller than with an air-glass or air-plastic interface.

Suitable methods to implement the backlight are:
OLED stripes;
Specially patterned waveguides,
A display panel which can be an OLED display or and LCD with an LED backlight.

This invention enables a trade-off between crosstalk and light output. To keep crosstalk low, the aperture of the backlight stripes has to be kept small. There is also a practical lower aperture limit due to production methods, which is of the order of 10 µam for OLED and similar for waveguides.

The crosstalk will now be analysed.

When collimated light shines through the negative front lens 60, it is fanned out by an angle $\alpha_1$. For a collimated light source, the intensity profile as shown in FIG. 8 will be generated by the combination of the sub-pixels and the primary lens. The x-axis of FIG. 8 has the unit pixels, but for small angles the sub-pixel dimension can be related to angle, as one cone corresponds both to one lens pitch distance $p_1$ and an opening angle $\alpha_1$. This equivalence between sub-pixel distance across a lens and the angle is shown in FIG. 11.

The light transmitted through the back lens 64 is only partially collimated. It also has an intensity profile as shown in FIG. 11. As a consequence, the intensity profile of the system (one sub-pixel and one stripe) is the circular convolution of two profiles as represented in FIG. 12, which shows the circular convolution of the front and back intensity profiles, excluding crosstalk caused by the optics. The circular convolution of two positive shapes is always broader than the two inputs, and this can be seen in FIG. 11.

The intensity profile of the combination of the backlight stripes and the back lens 64 originates from the stripes having a certain thickness that is required to generate enough light. Like with the pixels, the thickness of a stripe can be related to an angle as one cone corresponds both to one pitch distance $p=p_2$ and an opening angle $\alpha=\alpha_2$.

Figure 11:
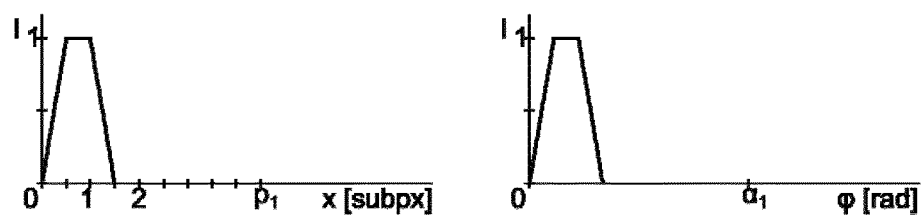
FIG. 11 shows how distance across a lens can be equated with the view angle.
Figure 12:
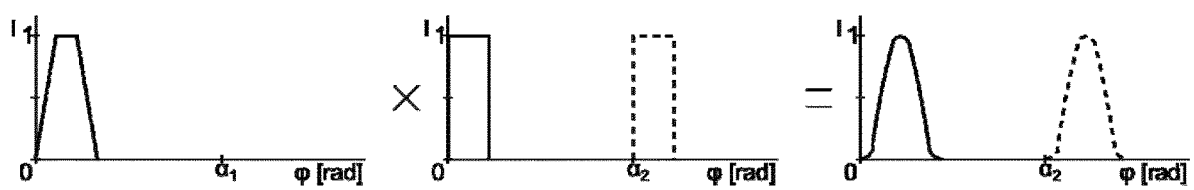
FIG. 12 shows the intensity profile of the system as the circular convolution of two profiles.
Figure 13:
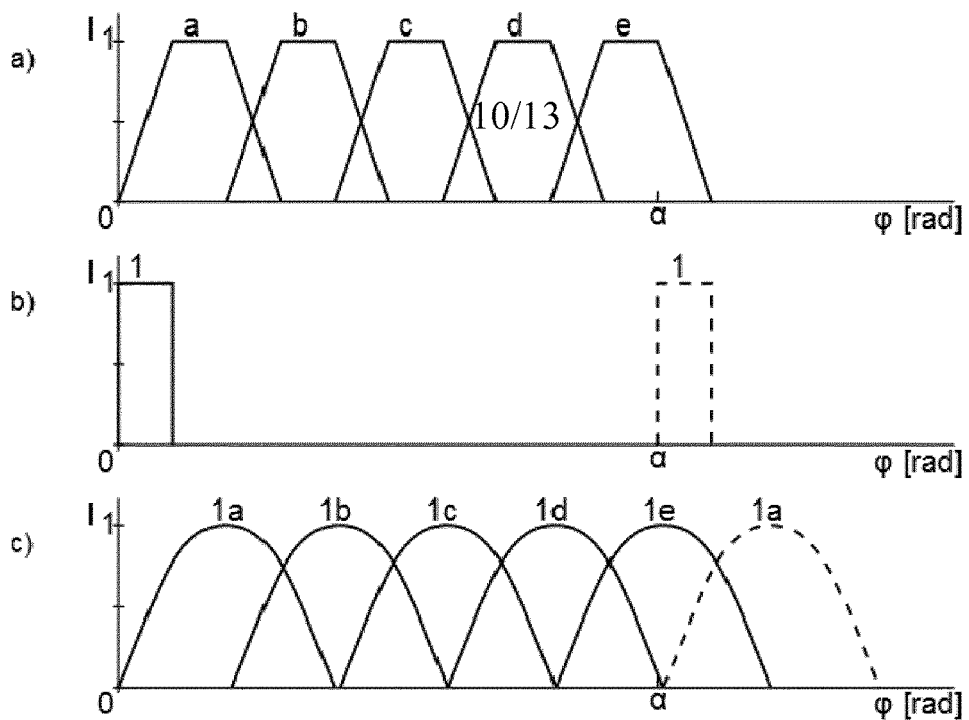
FIG. 13 shows the intensity profile when there is one backlight stripe per lenticular.
Figure 14:
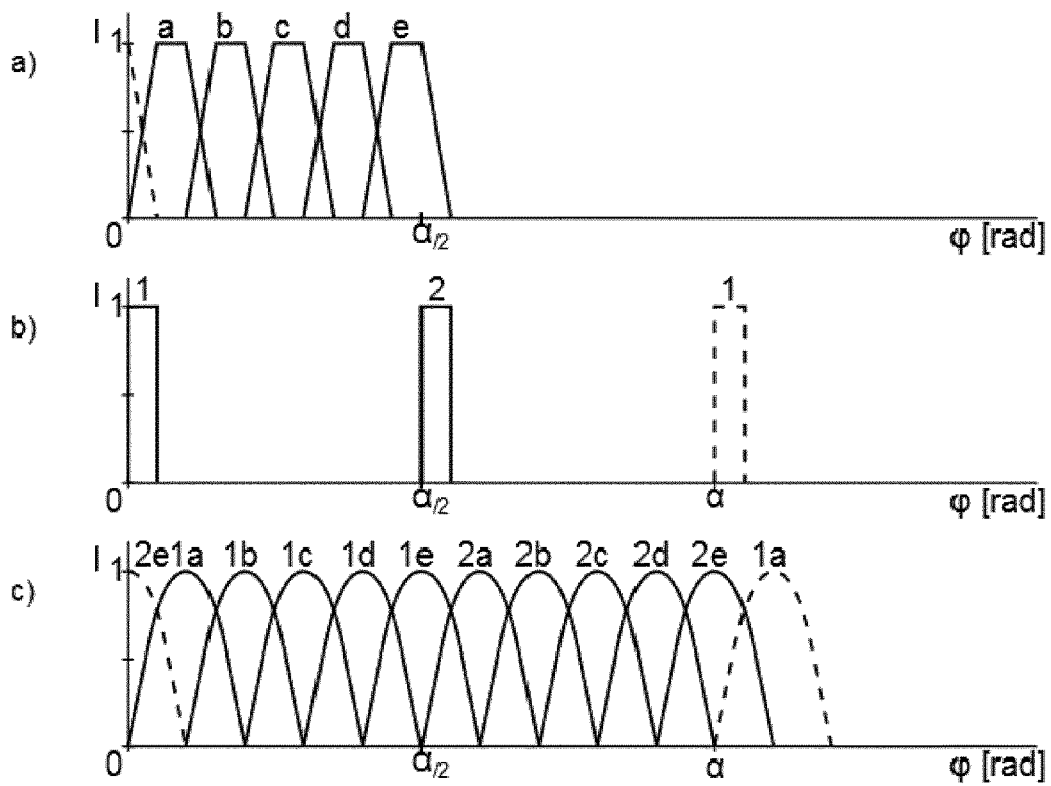
FIG. 14 shows the intensity profile when there are two backlight stripes per lenticular.

FIGS. 13 and 14 show what happens for N=1 (FIG. 10) and N=2 (FIG. 11).

FIG. 13 shows the circular convolution of the intensity profiles for N=1. FIG. 10(a) shows the angular crosstalk profile of five views (a . . . e) on the front display. FIG. 10(b) shows the angular crosstalk profile of the single view in from the secondary lens combined with the striped backlight. The circular convolution of these profiles is shown in FIG. 13(c) which shows the angular crosstalk profile of the system views (1a . . . 1e). The profile shapes are simplified.

FIG. 14 shows the circular convolution of intensity profiles for N=2. FIG. 14(a) shows the angular crosstalk profile of five views (a . . . e) on the front display. FIG. 14(b) shows the angular crosstalk profile of the two views (1, 2) that are generated by the secondary lens and the striped backlight (i.e. two different outputs from the striped backlight). The circular convolution of these profiles is shown in FIG. 14(c) which shows the angular crosstalk profile of the system views (1a . . . 1e, 2a . . . 2e). The profile shapes are again simplified.

To have the same overall intensity profile, the thickness of the stripes relative to the lens pitch ($p_2$) has to be halved when N is doubled.

Figure 15:
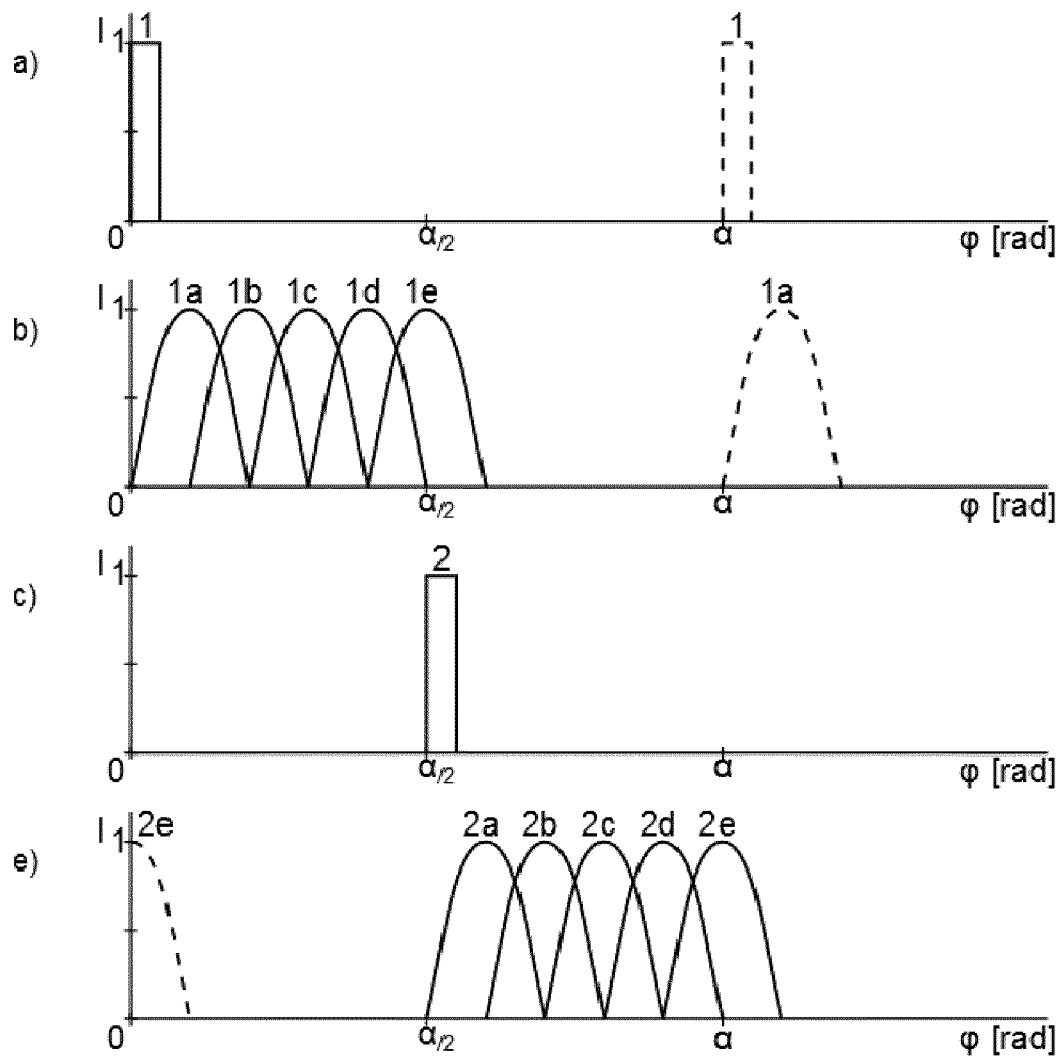
FIG. 15 is used to explain the time-sequential operation for FIG. 14.

FIG. 15 is used to explain the time-sequential operation for N=2.

FIG. 15(a) shows the output from the striped backlight together with the secondary lens for sub frame $t=t_1$. FIG. 15(b) shows the displayed intensity profiles for display for sub frame $t=t_1$. FIG. 15(c) shows the output from the striped backlight together with the secondary lens for sub frame $t=t_2$, and FIG. 15(d) shows the displayed intensity profiles for sub frame $t=t_2$.

For N=2 and equal stripe pitch and secondary lens pitch, the stripe has to be half the width of a sub-pixel to have the same level of crosstalk.

This result can be generalised. If $w_1$ is the width of a sub-pixel, and $w_2$ the width of a backlight stripe, then the reference "equivalent" size of a stripe is determined by:

$$\frac{w_1}{p_1} = N\frac{w_2}{p_2}.$$

$p_1$ and $p_2$ are the lenticular pitch of the primary and secondary lenticular lens array, respectively, so that $w_1/p_1$ is the width of a sub-pixel relative to a primary lenticular lens, and $Nw_2/p_2$ is the proportion of the backlight width which is occupied by the backlight output stripes.

More generically, the amount of crosstalk can be predicted by including a parameter C:

$$C\frac{w_1}{p_1} = N\frac{w_2}{p_2}.$$

This is the equation presented above.

For C=1, the system has a bit more crosstalk compared to a regular display with similar parameters. To have C significantly bigger than 1, seems useless. In principle, C should be as small as possible to avoid crosstalk, but big enough to ensure enough light output. With C=½, optical crosstalk may already be dominant.

Thus, the parameter C is preferably in the range 0.5<=C<=1.

A smaller stripe width gives a sharper crosstalk profile, which in turn allows reducing the pitch. The display can be made thinner because the width of the backlight stripes can be made smaller than the sub-pixel pitch of the display panel. This is generally the case because the production of a striped backlight is typically easier than that of a display panel. An OLED backlight would for instance have fewer layers than an LCD panel.

A thinner display is possible if the aperture of the stripes is less than half the sub-pixel pitch (with acceptable crosstalk), more preferably a quarter of the sub-pixel pitch (with minor crosstalk). This is both achievable and beneficial for bigger displays such as TV's that have a big pixel pitch and where the thickness of the lenticular sheet makes the display heavy.

Possible designs for the backlight will now be presented, based on an OLED or LED backlight with N>=2. The OLED backlight will be typically simpler than a full OLED display. The same holds for alternatives such as a LED backlight.

Figure 16:
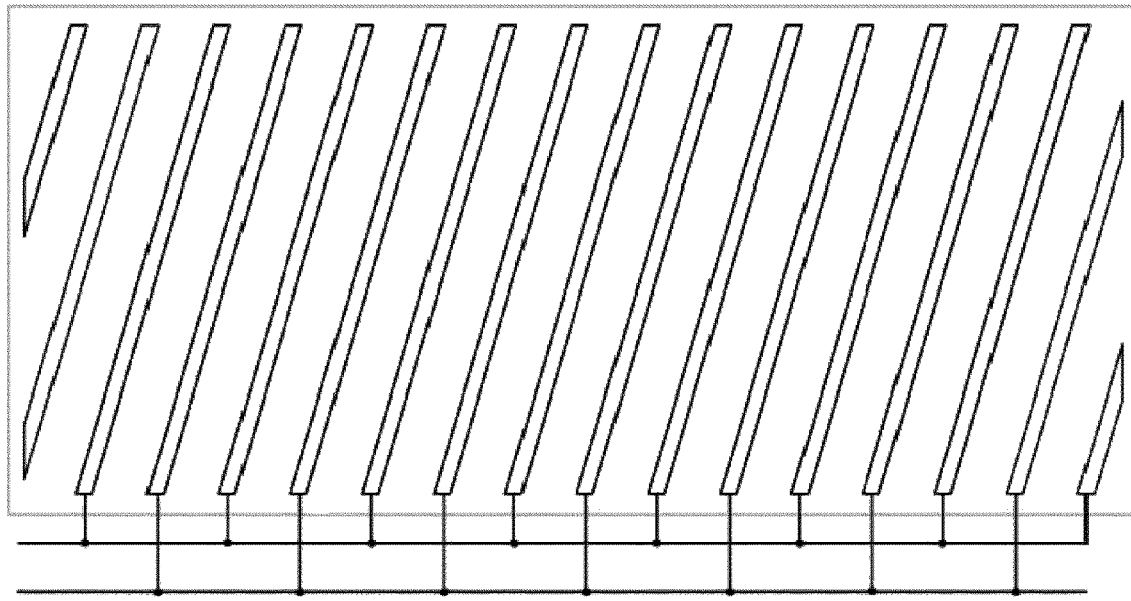
FIG. 16 shows one possible electrode structure for a dual phase backlight.

FIG. 16 shows one possible electrode structure for a dual phase (N=2) OLED backlight.

The backlight stripes are arranged as two alternating sets. The stripes in the backlight are slanted. The stripes are parallel to the lens optical axes, so that the slant angle of the backlight matches that of the lenticular lens.

Figure 17:
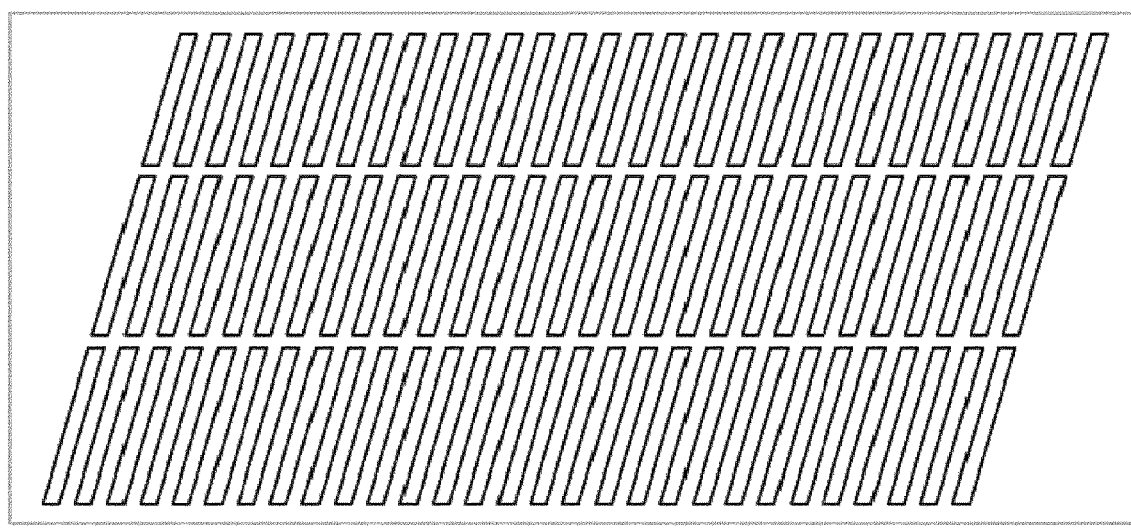
FIG. 17 shows a more advanced backlight with more segmented stripes.

FIG. 17 shows a more advanced OLED or LED backlight with more, segmented stripes. It is beneficial for reducing flicker due to time sequential operation, as well as to allow for viewing distance correction, to have more stripes. In that case only a limited number of stripes will be used during operation. Such a backlight is shown in FIG. 17. In this case, the stripes are independently addressable. As shown, each stripe may be segmented into sections.

For a system with N=1 (i.e. no time sequencing) no electrode structure is needed, and only a single common electrode is needed. For the case N=1 case, the backlight can be formed using a waveguide with stripes (or dots forming a stripe).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An autostereoscopic display device comprising:
   a backlight;
   a display panel, the display panel comprising rows and columns of pixels; and
   a lenticular arrangement,
   wherein the backlight provides a striped output comprising stripes in a column direction or offset by an acute angle to the column direction,
   wherein the lenticular arrangement comprises:
      a first lenticular lens array; and
      a second lenticular lens array,
      wherein the first lenticular lens array is disposed on the side of the display panel facing the display output,
      wherein the first lenticular lens array comprises negative lens elements,
      wherein the first lenticular lens array is arranged to direct different display panel pixel outputs in different directions,
      wherein the second lenticular lens array is disposed on the opposite side of the display panel, facing the backlight,
      wherein the second lenticular lens comprises positive lens elements, wherein the second lenticular lens array is arranged to provide collimation of the striped backlight output.

2. The device as claimed in claim 1, wherein the backlight stripes are slanted with respect to the display column direction.

3. The device as claimed in claim 1, wherein an aperture width of each backlight stripe is less than one quarter of a pitch of sub-pixels of the display panel.

4. The device of claim 1,
   wherein a pitch of the second lenticular lens array is a factor, N, greater than a pitch of the backlight stripes, and
   wherein N is an integer greater than one.

5. The device as claimed in claim 2,
   wherein the first lenticular lens array and the second lenticular lens arrays have the lens axes slanted with respect to the display column direction,
   wherein the lens axes and the backlight stripes are parallel to each other.

6. The device as claimed in claim 4, wherein N equals two.

7. The device as claimed in claim 4, further comprising a controller circuit;
   wherein the controller circuit drives the display panel in a sequence of N subframes, and
   wherein each subframe is synchronized with illumination with a respective set of backlight stripes.

8. The device as claimed in claim 4,
   wherein $$\tan \alpha_1 = \frac{\tan \alpha_2}{N},$$

wherein $\alpha_1$ is an angular spread of light from the lens elements of the first lenticular lens array, and
wherein $\alpha_2$ is an angle of the viewing cone of light to the lens elements of the second lenticular lens array.

9. The device as claimed in claim 4,
   wherein $$C \frac{w_1}{p_1} = N \frac{w_2}{p_2}.$$

wherein w1 is a width of a sub-pixel of the display panel,
wherein $p_1$ is a pitch of the first lenticular lens array,
wherein $w_2$ a width of each backlight stripe,
wherein $p_2$ is the pitch of the second lenticular lens array, and
wherein C is 1.0 or less.

10. The device as claimed in claim 8, further comprising a controller circuit,
   wherein the controller circuit drives the display panel in a sequence of N subframes; and
   wherein each subframe is synchronized with illumination with a respective set of backlight stripes.

11. The device as claimed in claim 8, wherein an aperture width of each backlight stripe is less than half of a pitch of sub-pixels of the display panel.

12. The device as claimed in claim 9, wherein C is in the range 0.5 to 1.0.

13. The device as claimed in claim 10, wherein a pitch of the first lenticular lens array is a factor of at least 4 greater than the pitch of the second lenticular lens array.

14. The device as claimed in claim 10, further comprising a controller circuit,
   wherein the controller circuit drives the display panel in a sequence of N subframes, and
   wherein each subframe is synchronized with illumination with a respective set of backlight stripes.

15. The device as claimed in claim 10, wherein an aperture width of each backlight stripe is less than half of a pitch of sub-pixels of the display panel.

16. The device as claimed in claim 10, wherein an aperture width of each backlight stripe is less than one quarter of a pitch of sub-pixels of the display panel.

* * * * *